United States Patent [19]

Welschof

[11] 4,257,244
[45] Mar. 24, 1981

[54] TELESCOPIC DRIVE SHAFT

[75] Inventor: Hans-Heinrich Welschof, Rodenbach, Fed. Rep. of Germany

[73] Assignee: Löhr & Bromkamp GmbH, Offenbach am Main, Fed. Rep. of Germany

[21] Appl. No.: 1,695

[22] Filed: Jan. 8, 1979

[30] Foreign Application Priority Data

Jan. 12, 1978 [DE] Fed. Rep. of Germany ....... 2801182

[51] Int. Cl.³ .............................................. F16D 3/06
[52] U.S. Cl. ...................... 64/23; 403/109; 403/118
[58] Field of Search ............... 64/9 A, 9 R, 23.7, 23, 64/8, 14, 1 R; 403/109, 110, 118

[56] References Cited

U.S. PATENT DOCUMENTS

| 754,066 | 3/1904 | Hoffmann | 64/23 |
|---|---|---|---|
| 3,012,421 | 12/1961 | Cull | 64/9 A |
| 3,325,837 | 6/1967 | Hartmann | 64/23 |
| 3,356,424 | 12/1967 | Edwards | 64/23 |
| 4,075,872 | 2/1978 | Geisthoff | 64/23 |
| 4,103,514 | 8/1978 | Grosse-Entrup | 64/23.7 |

FOREIGN PATENT DOCUMENTS

725687 3/1955 United Kingdom ................ 64/23

*Primary Examiner*—Ira S. Lazarus
*Assistant Examiner*—Magdalen Moy
*Attorney, Agent, or Firm*—Toren, McGeady and Stanger

[57] ABSTRACT

In a telescopic drive shaft, torque is transmitted between an inner shaft member and an outer shaft member by ball-shaped roll bodies arranged in axially extending rows. The roll bodies are seated in axially extending grooves formed in each of the inner and outer shaft members. The rows of balls are located between transversely arranged guide rings or are held in a cage secured to a guide ring. The inner and outer surfaces of the guide ring are threaded and meshed with threads on the inner and outer shaft members. The pitch of the threads on the outer shaft member is opposite to the pitch of the threads on the inner shaft member.

9 Claims, 5 Drawing Figures

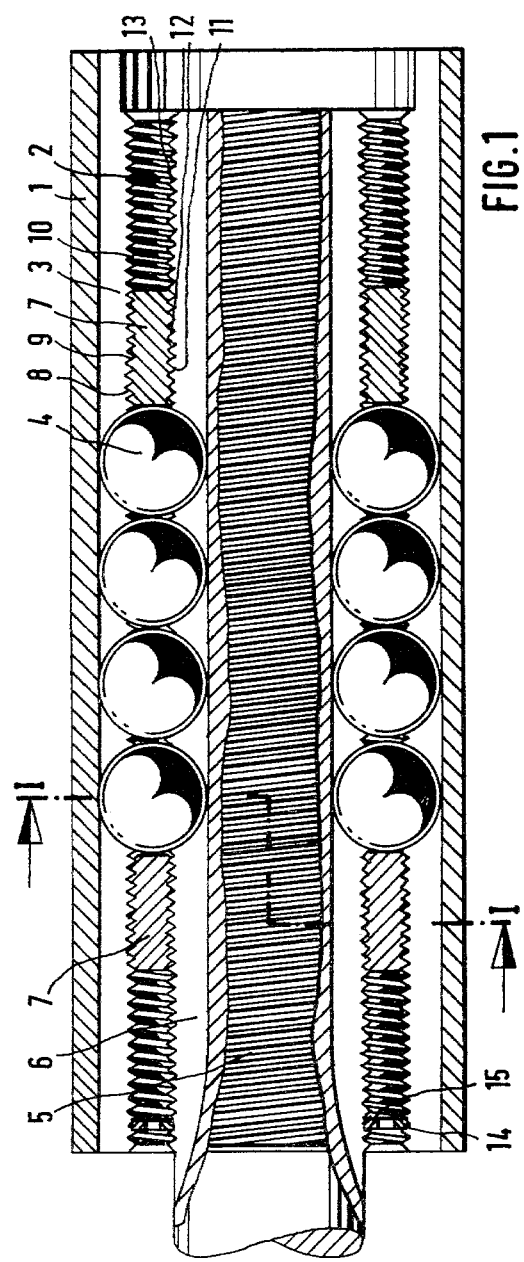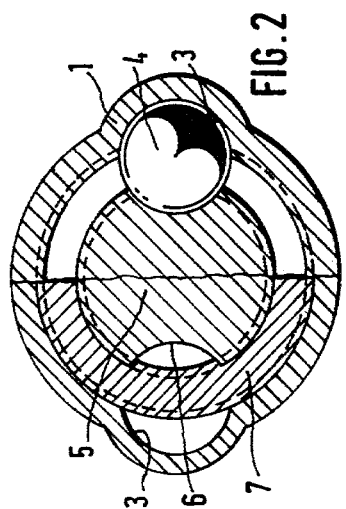

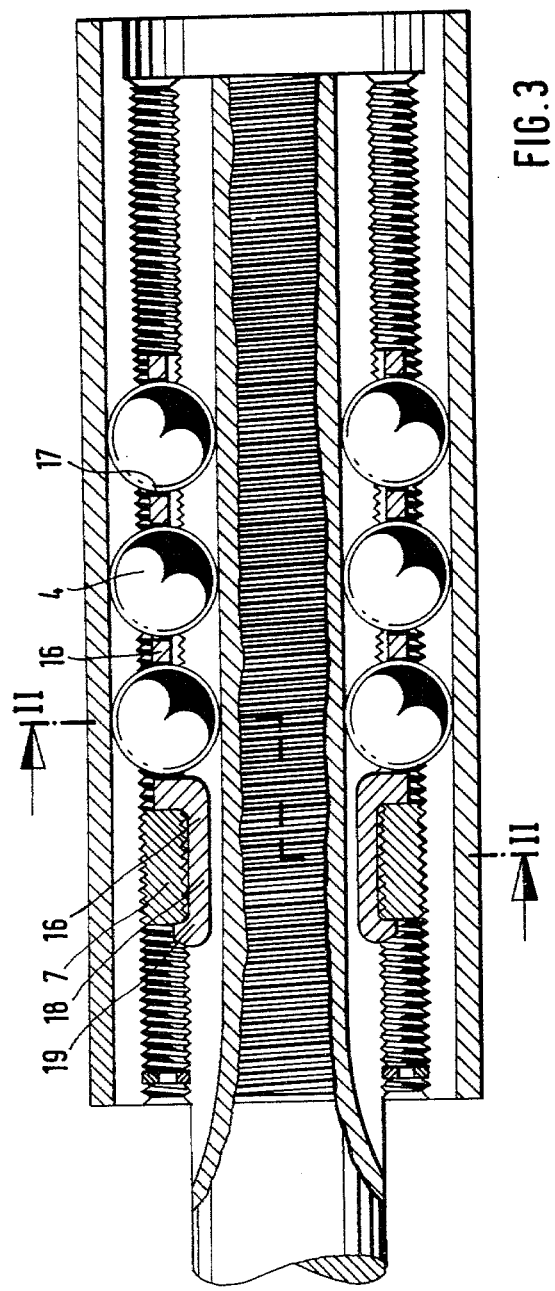
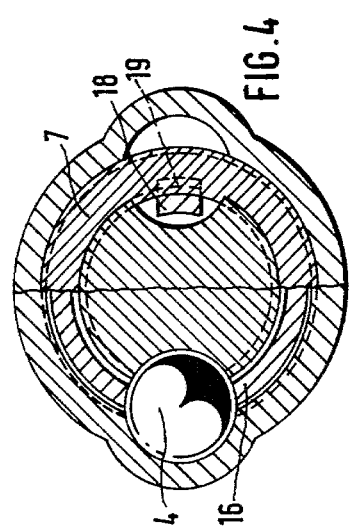
FIG.3
FIG.4

TELESCOPIC DRIVE SHAFT

SUMMARY OF THE INVENTION

The present invention is directed to a telescopic drive shaft including an inner shaft member laterally enclosed by an outer shaft member with axially extending rows of roll bodies seated in grooves in each of the shaft members for transmitting torque between them. Support means between the shaft members assures that the roll bodies are movable in a rolling manner between the shaft members.

There are known telescopic shafts, for example, note German Pat. No. 1,219,291, in which the danger of the telescoping shafts being damaged due to clamping, even in the case of high or peak torques is reduced by filling oil into the annular hollow space between the shaft parts. This ball type guidance, however, is very cumbersome and requires additional sealing. When leaks develop in such telescopic shafts, the oil loss on one hand and the penetration of dirt into the shaft on the other hand are to be expected with the result that satisfactory ball guidance cannot be ensured. Moreover, when the sealing action is damaged, it is to be expected that in the course of operation the shaft members will clamp with the possibility of breakage.

Therefore, in view of the foregoing, the primary object of the present invention is to provide a telescopic shaft including simple means for guiding the roll bodies which effect torque transmission along half of their sliding path.

In accordance with the present invention, support for the roll bodies is provided by guide rings located on each end of the axially extending rows of the roll bodies between the outer shaft member and the inner shaft member. Each guide ring is provided with a thread on its outer surface which meshes with a corresponding thread on the inner surface of the outer shaft member and, in addition, the guide ring has a thread on its inner surface which meshes with a corresponding thread on the outer surface of the inner shaft member. The pitch of the outer threads is opposite to the pitch of the inner threads.

This particular embodiment is advantageous because any clamping action between the telescoping shaft members which may occur under peak torques is prevented by assuring that the roll bodies are continuously effective even under the influence of increasing friction during peak torques, since the roll bodies always move with half of the shifting velocity of the telescoping shaft. The guide rings assure this action because of the opposite thread pitches on the inner and outer shaft members.

Easy operation of the telescopic shaft is provided by arranging the pitch of the outer thread and the inner thread of the guide ring in the range of one to three times as large as its mean diameter. Such a steep thread continues to operate without excessively large friction losses during axial shifts within the shaft.

In another embodiment of the invention a cage is used for guiding the roll bodies. The cage is connected to a guide ring so that it is rigid in the axial direction and rotatable in the circumferential direction. This embodiment affords control of the roll bodies, since the cage guiding them is fastened to the guide rings in the axial direction.

To guide the roll bodies exactly for half of any axial shift in the telescopic drive shaft, the pitch of the inner threads is equal to the pitch of the outer threads and the roll bodies contact the grooves in the shaft members along a pair of parallel straight lines. The lines contact in the inner and outer grooves are diametrically opposite one another.

For the inexpensive production of such a telescopic drive shaft, standard parts should be used. Accordingly, the roll bodies are in the form of balls.

In another embodiment of the present invention, the pitch of the inner threads is different from the outer threads. In such an arrangement the ratio of the pitch of the inner threads to the pitch of the outer threads is equal to the ratio of the spacing of the lines of contact of the roll bodies in the inner groove from the roll axis to the spacing of the lines of contact of the roll bodies in the outer groove, from the roll axis.

In this embodiment, it is possible for the rolling movement of the roll bodies to occur in accordance with the ratio rather than at half the velocity of the axial shift within the telescoping shaft. As a result, the axial path of the roll bodies in the expensive outer shaft member can be reduced so that this component is less expensive. The control of the roll bodies can be effected by the guide rings described above, so that only the pitch of the inner and outer threads are dimensioned differently. The differential rolling movement is attained by maintaining the ratio i between the two pitches and the rolling contact lines in the grooves as equal.

$$i = \frac{S_A}{S_i} = \frac{\cos \delta a + \cos \delta i}{\cos \delta i}$$

In the equation:
 $S_A$ = pitch of the outer thread
 $S_i$ = pitch of the inner thread
 $\delta a$ = angle between contact point of the ball in the outer groove and the line perpendicular to the rolling axis
 $\delta i$ = angle between contact point of the ball in the inner groove and the line perpendicular to the rolling axis.

In the case of differently dimensioned contact angles, $\delta a$ or $\delta i$, the rolling path differs, because the perpendicular distance from the contact point in each groove to the rolling axis of the ball is different.

The various features of novelty which characterize the invention are pointed out with particularity in the claims annexed to and forming a part of this disclosure. For a better understanding of the invention, its operating advantages and specific objects attained by its use, reference would be had to the accompanying drawings and descriptive matter in which there are illustrated and described preferred embodiments of the invention.

BRIEF DESCRIPTION OF THE DRAWING

In the drawing:
FIG. 1 is an axially extending sectional view through a telescopic drive shaft embodying the present invention;
FIG. 2 is a transverse sectional view taken along the line I—I in FIG. 1;
FIG. 3 is an axially extending sectional view, similar to that shown in FIG. 1, however, with the balls within the drive shaft guided by a cage;
FIG. 4 is a transverse sectional view taken along the line II—II in FIG. 3.

DETAIL DESCRIPTION OF THE INVENTION

Figure 5:
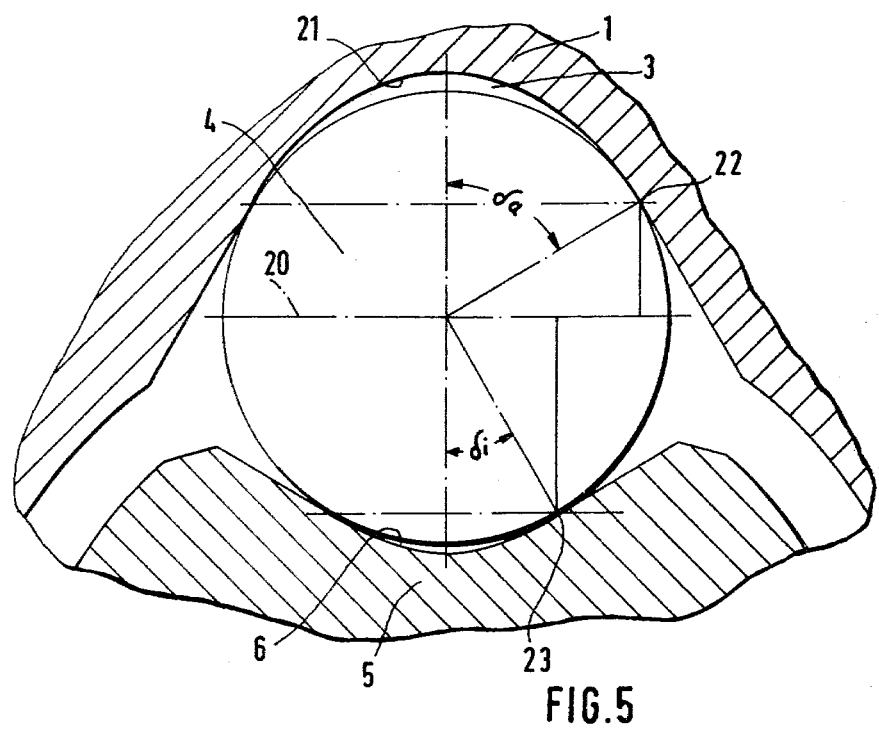
FIG. 5 is a partial sectional view of a ball within the grooves in the inner and outer shaft members of the telescopic drive shaft illustrating the contact points of the ball with the surfaces of the grooves.

In FIGS. 1 and 2 a telescopic drive shaft is illustrated and includes an outer tubular shaft member 1 forming an axially extending cylindrical hollow space 2 in which oppositely arranged grooves 3 are provided for seating balls 4. Positioned within the cylindrical hollow space 2 of the outer shaft member 1 is an axially movable inner shaft member 5. Similar to the outer shaft member 1, the inner shaft member 5 has a pair of grooves 6 on opposite sides of the member each corresponding to and located opposite one of the grooves 3 in the outer shaft member 1. One groove 3 of the outer shaft member 1 and one groove 6 of the inner shaft member 5 receive and seat an axially extending row of balls 4 which effect torque transmission between the shaft members. To prevent any clamping of the balls during a longitudinal or axial shift between the outer shaft member and the inner shaft member 5, during torque transmission operation, the rolling movement of the balls 4 within the grooves is ensured by guide rings 7.

Each guide ring 7 has a thread 9 with a steep pitch on its outer surface 8. These steeply pitched threads 9 on the guide rings 7 are guided in correspondingly steeply pitched threads 10 on the inner surface of the outer shaft member 1. The inner surface 11 of each guide ring is also provided with a steeply pitched thread 12, however, the pitch of this thread is opposite to the pitch of the thread 9. The inner thread 12 on the guide rings 7 meshes with a corresponding thread 13 on the outer surface of the inner shaft member 5. When the outer shaft member 1 is shifted in the axial direction relative to the inner shaft member 5, if the pitch of the inner and outer threads is equal, the guide rings are held to half the axial shift and, accordingly, the balls 4 perform a rolling movement along half of the axial shifting dimension. The guide rings 7 are each arranged at an opposite end of the axially extending rows of balls 4 and assure an exact guidance of the balls. To provide an axial limit in the event the telescopic drive shaft is extended, a guard ring 14 is provided in the hollow space 2 within the outer shaft member and serves as a stop for the guide ring 7. To afford a longitudinal limit in the event the telescopic drive shaft is contracted, a guard ring 15 is provided in a corresponding groove on the outer periphery of the inner shaft member and this guard ring also serves as a stop for the guide ring 7.

FIGS. 3 and 4 illustrate another embodiment of the telescopic drive shaft shown in FIGS. 1 and 2. The main difference in this embodiment is that a single guide ring 7 is used, because the balls are guided and held by a guide cage 16. The guide cage extends in the axial direction of the shaft and also extends circumferentially around the inner shaft member. The cage 16 has a tubular form and contains a number of recesses 17 corresponding to the number of balls. In the region of each guide groove, the cage is provided with mounting elements 18 which, in a form-locking manner, embrace the single guide ring 7 via holding lugs 19 which are forced on in a non-cutting procedure. The arrangement of the cage 16 on the guide ring 7 ensures that it is fixed in the axial direction. In the circumferential direction, however, the guide ring 7 can move freely so that the necessary movements of the guide ring can be formed between the oppositely pitched threads 10, 13.

In FIG. 5 a groove 3 in the outer shaft member 1 and a groove 6 in the inner shaft member 5 are shown in detail on an enlarged scale. In the event of a relative movement of the shaft members 1, 5 perpendicular to the plane of the drawing, the ball 4 will roll about the rolling axis 20 which extends transversely of the axial direction of the grooves. Accordingly, the rolling path of the ball 4 is directed over the bottom 21 of the groove, however, the ball is spaced from the bottom and contacts the groove along contact points or lines 22, 23. It can be seen that each groove 3, 6 provides a different contact line and, as a result, a different contact angle $\delta a$ or $\delta i$. In FIG. 5 the contact angle is measured between a line extending perpendicularly of the roll axis and a line extending from the center of the ball to the contact point or line 22, 23. If the contact angles $\delta$ are equal, the perpendicular distance from the rolling axis to the contact point is also equal and the rolling paths of the balls within the grooves when the inner and outer shaft members move relative to one another are the same. When the rolling paths are equal, the balls are guided along half of the path of movement of the shaft parts. When the path of movement or shifting path of the shaft parts is designed in this manner, however, it is absolutely necessary that the pitch of the threads 9, 10 or 12, 13 are equal.

In the event the thread pitches are not the same, to afford a different axial path of the balls, for example, when the hub is shortened, this control can be effected by the use of different contact angles $\delta a$, $\delta i$. The embodiment illustrated in FIG. 5 discloses such an arrangement. In this Figure it can be clearly noted that the contact angle $\delta a$ is larger than the contact $\delta i$. Accordingly, the perpendicular distance between the contact line or point 22 and the rolling axis 20 is smaller than the perpendicular distance from the contact line or point 23 to the rolling axis. By selecting the contact angles in this manner it is possible that the balls seated in the groove 6 in the inner member 5 travel a lesser distance than in the groove 3 in the outer member 1. As a result, the pitch of the threads must be dimensioned accordingly. This dimensioning of the thread pitches relative to one another in the same ratio as the contact angles is proposed by the general formula and must be defined individually for each embodiment.

While specific embodiments of the invention have been shown and described in detail to illustrate the application of the inventive principles, it will be understood that the invention may be embodied otherwise without departing from such principles.

What is claimed is:

1. Telescopic drive shaft comprising an axially extending inner shaft member, an axially extending outer shaft member laterally enclosing and spaced radially outwardly from said inner shaft member, roll bodies in contact with and positioned between said inner shaft member and outer shaft member for transmitting torque therebetween, said roll bodies disposed in at least two axially extending rows spaced angularly apart around said inner shaft member, and support means for said roll bodies, wherein the improvement comprises that said support means comprises at least one guide ring extending around said inner shaft member within said outer shaft member and located at one end of the rows of said roll bodies, said guide ring having a radially outer surface and a radially inner surface, said outer shaft member having a first thread on the inner surface thereof, said inner shaft member having a second thread on the outer surface thereof, said guide ring having a third thread on said radially outer surface in meshed engagement with said first thread and a fourth thread on said radially inner surface thereof in meshed engagement with said second thread, and the pitch of said first and third threads being opposite to the pitch of said second and fourth threads.

2. Telescopic drive shaft, as set forth in claim 1, wherein said support means comprises a pair of said guide rings each positioned at an opposite end of the rows of said roll bodies.

3. Telescopic drive shaft, as set forth in claim 1, wherein the pitch of said first and third threads and the pitch of said second and fourth threads is in the range of one to three times as large as the mean diameter of said guide ring.

4. Telescopic drive shaft, as set forth in claim 1, wherein said support means includes a cage extending in the axial direction of and located between said inner and outer shaft members, said cage extending circumferentially around said inner shaft member, said cage connected to said guide ring at one end of the rows of said roll bodies and extending therefrom toward the other end of the rows of said roll bodies, said cage being rigid in the axial direction and rotatable in the circumferential direction.

5. Telescopic drive shaft, as set forth in claim 1, wherein said roll bodies are ball-shaped.

6. Telescopic drive shaft, as set forth in claim 5, wherein axially extending grooves are formed in the inner surface of said outer shaft member and in the outer surface of said inner shaft member and the number of grooves in each of said outer and inner shaft members corresponds to the number of rows of said roll bodies, each of said roll bodies in said grooves has a roll axis extending transversely of the axial direction of the rows of said roll bodies, said grooves being shaped so that each of said roll bodies rolls along a pair of parallel axially extending contact lines in each said groove spaced a perpendicular distance to the roll axis less than the radius of said ball-shaped bodies.

7. Telescopic drive shaft, as set forth in claim 6, wherein the pitch of each of said first and third threads is equal to the pitch of each of said second and fourth threads, each of the contact lines of said roll bodies in each of said grooves in said outer shaft member is diametrically opposite one of the contact lines of said roll bodies in the corresponding said grooves in said inner shaft member.

8. Telescopic drive shaft, as set forth in claim 6, wherein the pitch of said first and third threads is different from the pitch of said second and fourth threads and the ratio of the pitch of said second and fourth threads to the pitch of said first and third threads is equal to the ratio of the perpendicular distance from the roll axis of said roll bodies to the contact lines in said groove in said inner shaft member to the perpendicular distance from the roll axis of said roll bodies to the contact lines in said grooves in said outer shaft member.

9. Telescopic drive shaft, as set forth in claim 1, includes stop means for limiting the axial movement of said inner and outer shaft members relative to one another.

* * * * *